United States Patent Office 3,456,005
Patented July 15, 1969

3,456,005
PREPARATION OF TRICHLOROLACTIC ACID
Pauls Davis, Gibraltar, and Herwart C. Vogt, Grosse Ile, Mich., assignors to Wyandotte Chemicals Corporation, Wyandotte, Mich., a corporation of Michigan
No Drawing. Filed May 6, 1966, Ser. No. 548,040
Int. Cl. C07c 59/08
U.S. Cl. 260—535     3 Claims

ABSTRACT OF THE DISCLOSURE

Trichlorolactic acid is prepared in high yields by oxidizing 3,3,3-trichloropropylene oxide with nitric acid at a temperature of from 40° C. to 120° C.

---

The present invention relates to a process for the preparation of trichlorolactic acid. More particularly, the invention relates to a process for the preparation of trichlorolactic acid which comprises oxidizing 3,3,3-trichloropropylene oxide with nitric acid. By the process of the present invention, trichlorolactic acid is readily prepared in yields greater than 90%.

Trichlorolactic acid is known in the art. It is a useful intermediate in the preparation of linear polyesters. As a result of the presence of the highly stable trichloromethyl group, polyesters prepared from this acid possess excellent flame retardant properties. In addition, trichlorolactic acid may also be oxyalkylated to yield surface active agents and may be employed as a plasticizer for various resins, particularly polyvinyl resins.

In accordance with the present invention, it has now been determined that trichlorolactic acid may be readily prepared in substantial yields by oxidizing 3,3,3-trichloropropylene oxide with nitric acid.

3,3,3-trichloropropylene oxide, which is oxidized in accordance with the present invention, may be prepared by known methods such as by dehydrohalogenation of 1,3,3,3-tetrachloro-2-propanol. The propanol may, in turn, be prepared by the reduction of the appropriate halogenated acetone with aluminum isopropoxide. 3,3,3-trichloropropylene oxide may also be prepared by the reaction of chloral with diazomethane in ether solution as described by S. Schlotterbeck, Ber. 42, 2561 (1909).

The amounts of trichloropropylene oxide and nitric acid which may be employed in the process of the invention may vary considerably. Generally, however, mole ratios of oxide to acid of from 1:1 to 1:5 are preferred.

In accordance with the process of the present invention, the reactants are added to a reaction vessel and allowed to react by applying heat to the vessel. The reaction may be carried out at temperatures of from 40° C. to 120° C., preferably 50° C. to 70° C. Atmospheric pressure is preferred, although it is possible to carry out the reaction at reduced pressure. Since the reaction proceeds so readily, a catalyst is not required. However, if it is desired to accelerate the reaction, small amounts of an accelerator may be employed. Nitrogen dioxide is a preferred accelerator for this reaction. The time of the reaction will vary, depending upon the amounts of reactants, the catalyst employed, if any, and the temperature of the reaction. Generally, however, from 0.5 to 5 hours will be sufficient to assure completion of the reaction. Since nitrogen dioxide fumes are evolved during the reaction, completion of the reaction is easily determined by cessation of the fumes. Because 3,3,3-trichloropropylene oxide is soluble in nitric acid, an inert diluent is not required in the process of the invention, thereby rendering recovery problems minimal. Upon completion of the reaction, excess nitric acid may be removed from the resulting acid by evaporation or by any other standard separation procedure. The acid, a white crystalline solid, may be purified by crystallization from benzene.

The following examples illustrate the invention. All parts are by weight unless otherwise stated.

Example I

A reaction vessel equipped with stirrer, thermometer and heat exchange means was charged with 16 parts of 3,3,3-trichloropropylene oxide and 75 parts of 65% nitric acid. The charge was heated to about 60° and typical yellow fumes of nitrogen dioxide were observed. After maintaining the temperature of the reaction at between 60° C. and 65° C. for one hour, evolution of nitrogen dioxide fumes ceased. The reaction mixture was then refluxed for an additional hour and the excess nitric acid was removed from the mixture by evaporation at 60° C. The product (17.5 parts, 91% conversion) obtained was crystallized from benzene and melted at 110° C. The neutralization equivalent 190.0 (theory 193.5) and chlorine content 54.1% (theory 55.0%) are in reasonable agreement with theory and the melting point of 114° C. is in good agreement with the values given in the literature (110° C. to 118° C.).

Example II

A reaction vessel equipped as in Example I was charged with 161.5 parts of 3,3,3-trichloropropylene oxide and 360 parts of 70% nitric acid. The charge was heated to about 50° C. and about one part of nitrogen dioxide was added to accelerate the reaction. After heating the reaction mixture at 50° C. to 65° C. for about three hours, evolution of nitrogen dioxide fumes ceased. The reaction mixture was then refluxed for an additional hour and the excess nitric acid was removed by evaporation at 60°. A white crystalline material (191 parts, 99.5% conversion) was recovered, which melted at 108.6° C. The infrared spectrum for this material matched the standard spectrum for trichlorolactic acid.

Example III

A reaction vessel equipped as in Example I was charged with 323 parts of 3,3,3-trichloropropylene oxide and 720 parts of 70% nitric acid. The charge was heated to about 60° C. and maintained at between 60° C. to 65° C. for about two hours, at which time evolution of nitrogen fumes ceased. After evaporation of the excess nitric acid at 60° C., 378.2 parts (97.5% conversion) of a white crystalline solid was obtained. The recrystallized product melted at 114° C. and infrared analysis indicated the product to be trichlorolactic acid.

What is claimed is:
1. A process for the preparation of trichlorolactic acid which comprises oxidizing 3,3,3-trichloropropylene oxide at a temperature of from 40° C. to 120° C., with nitric acid, the mole ratio of oxide to acid being from about 1:1 to 1:5.
2. The process of claim 1 when nitrogen dioxide is employed as initiator.
3. The process of claim 1 wherein the temperature is from 50° C. to 70° C.

References Cited

UNITED STATES PATENTS 2,811,546  10/1957  Robertson et al. __ 260—535 XR
2,847,464  8/1958   Robertson et al.

OTHER REFERENCES

Pujo et al.: Chem. Ab., vol. 51, 11, 244 (1957).
Istratov et al.: Chem. Ab., vol. 61, 1747 (1964).
Colonge et al.: Societe chimique de France, December 1964, pp. 2436–2439.
Carignan, Chem. Ab., vol. 13, 261(F), (1964).

LORRAINE A. WEINBERGER, Primary Examiner
ALBERT P. HALLUIN, Assistant Examiner